United States Patent [19]

Suzuki et al.

[11] 4,364,056
[45] Dec. 14, 1982

[54] INTERACTIVE GRAPHIC SYSTEM

[75] Inventors: Yoshihiro Suzuki; Shuichi Nakagawa; Yasuo Wako; Yoshihiro Ogawa; Mamoru Yamaguchi; Toshio Kimura, all of Tokyo, Japan

[73] Assignee: Yokogawa Electric Works, Ltd., Tokyo, Japan

[21] Appl. No.: 273,380

[22] Filed: Jun. 15, 1981

[51] Int. Cl.³ ............................................. G01D 9/40
[52] U.S. Cl. ................................................... 346/29
[58] Field of Search ............................. 346/29; 354/4

[56] References Cited
U.S. PATENT DOCUMENTS

| | | | |
|---|---|---|---|
| 3,573,842 | 4/1971 | Colpitts | 346/29 |
| 3,600,513 | 8/1971 | Pendred et al. | 354/4 X |
| 3,610,119 | 10/1971 | Gerber et al. | 354/4 |
| 3,881,098 | 4/1975 | Rich | 354/4 X |

Primary Examiner—Donald A. Griffin
Attorney, Agent, or Firm—Parmelee, Bollinger & Bramblett

[57] ABSTRACT

An interactive graphic system is provided for automatically recording lines, symbols or marks by inputting plotting information in a step-by-step mode in an interactive system. The systems comprise a data setter for specifying, among various predetermined graphs, a graph to be plotted and for setting plotting data concerning the graph thus specified, a plotter for providing records in association with input signals, a display for requiring the plotting data inputs, and a controller for suitably controlling the various sections. The system is formed into one unit, so that the plotter can directly plot the necessary records with plotting data given by the data setter, and that the plotting operation is simplified and the system itself is small in size and low in manufacturing cost.

6 Claims, 7 Drawing Figures

FIG.4

| DISPLAY | KEY |
|---|---|
| AXIS | [41d] [43a] |
| SIZE X,Y = | [6][0] , [5][0] [43a] |
| ORIGIN = | [2][5] , [1][0] [43a] |
| X SEGMENT = | [6] [43a] |
| Y SEGMENT = | [5] [43a] |
| FRAME = | [0] [43a] |

FIG.5

| DISPLAY | KEY |
|---|---|
| B.GRAPH | [41a] [43a] |
| NO OF DATA = | [6] [43a] |
| GRAPH PATTERN = | [1] [43a] |
| MINIMUM Y = | [0] [43a] |
| MAXIMUM Y = | [1] [0] [0] [43a] |
| DATA 001 = | [4] [0] [43a] |
| DATA 002 = | [7] [5] [43a] |
| DATA 003 = | [6] [0] [43a] |
| DATA 004 = | [2] [5] [43a] |
| DATA 005 = | [9] [0] [43a] |
| DATA 006 = | [5] [5] [43a] |
| END | [41f] [43a] |
| DATA = | [2] [43a] |
| PATTERN = | [1] [43a] |
| > | [41f] [43a] |
| DATA = | [5] [43a] |
| PATTERN = | [1] [43a] |

INTERACTIVE GRAPHIC SYSTEM

BACKGROUND OF THE INVENTION

1. Field of the Invention

This invention relates to an interactive graphic system which can record predetermined lines, symbols or marks directly on the plotting surface by inputting plotting information.

2. Description of the Prior Art

Heretofore, in order to plot figures or graphs on a recording sheet, the following two methods have been employed. In one of the methods, a computer or a calculator and a plotter are combined, so that the coordinate signals of figures or graphs stored in the computer or the calculator are successively applied to the plotter to plot the figures or graphs. In the other method, a cathode-ray-tube display unit and a plotter are combined, so that a picture on the display unit is hard-copied on the plotter.

However, these conventional methods are disadvantageous in that, since the plotter itself can draw simple figures only, the provision of an external unit such as a computer, a calculator or a cathode-ray-tube display unit is essential for drawing figures or graphs, and the combination of the external unit and the plotter makes the entire device considerably bulky.

Furthermore, the operation of the computer or calculator is not simple. That is, since the computer or calculator is designed for general purposes, it is necessary to carry out intricate operations by referring to an operating manual containing a large amount of description even in drawing a relatively simple figure or symbol. Accordingly, the conventional methods are disadvantageous.

On the other hand, in a special calculator or in a cathod-ray-tube display terminal, a long instruction word or sentence which is frequently used is assigned to one key thereby simplifying the plotting operation. However, the operation of assigning such a word or sentence to the key is intricate.

SUMMARY OF THE INVENTION

Accordingly, a primary object of this invention is to provide an interactive graphic system in which all of the above-described difficulties accompanying a conventional graphic system have been eliminated, and which system can draw figures or graphs with lines, symbols and marks by itself.

Another object of the invention is to provide an interactive graphic system in which plotting information is given by setting means, and necessary figures or graphs can be drawn directly on the plotting surfaces of a recorder without monitoring the figures or graphs with a cathode-ray-tube or the like.

A further object of the invention is to provide an interactive graphic system which is provided with special keys facilitating the drawing of various graphs such as a bar graph, a polygonal line and a pie chart, so that the various graphs can be drawn by simple operations.

BRIEF DESCRIPTION OF THE DRAWINGS

The invention, together with further objects, aspects and advantages thereof, will be better understood from the following description taken in conjunction with the accompanying drawings in which:

FIGS. 4 and 5 are explanatory diagrams showing one example of an operating procedure for the interactive graphic system of the invention.

DETAILED DESCRIPTION OF THE PREFERRED EMBODIMENTS

Figure 1:
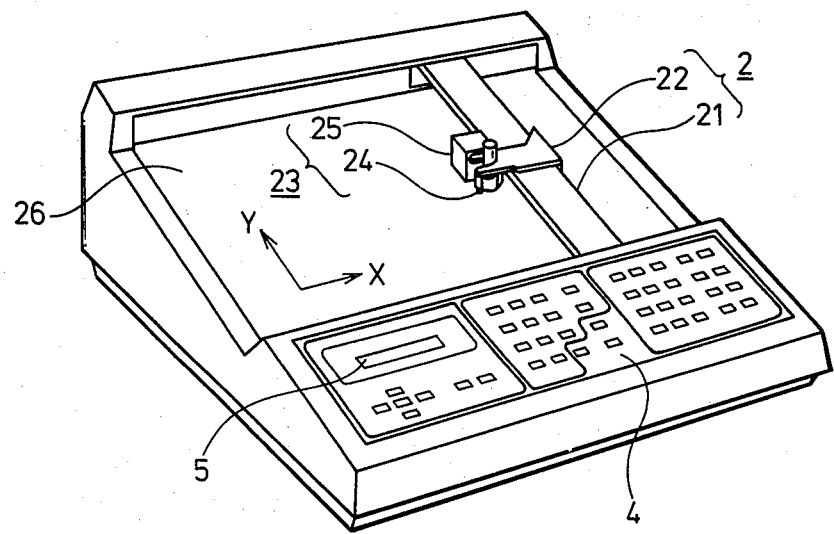
FIG. 1 is a perspective view showing the external appearance of one example of an interactive graphic system according to the invention.
Figure 2:
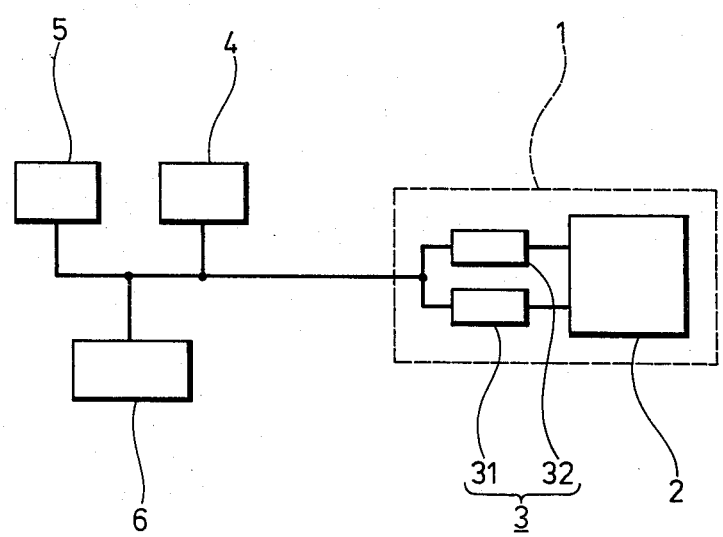
FIG. 2 is a block diagram showing an electrical circuit employed in the interactive graphic system of the invention.

Referring now to FIGS. 1 and 2, the interactive graphic system embodying the present invention comprises a plotting means 1, a data (or information) setting means 4, a display means 5, and a controller 6. The plotting means 1 comprises an analog X-Y recorder 2, and a D/A (digital-to-analog) converter 3. A digital plotter may be employed as the plotting means. The D/A converter 3 is made up of an X-axis D/A converter 31 and an Y-axis D/A converter 32, in which an X-axis signal and a Y-axis signal from the controller 6 are converted into analog signals, respectively, which are applied to the recorder 2. The X-Y recorder 2 has an X-axis carriage 21 which is displaced in an X-axis direction in response to the X-axis input signal, and a Y-axis carriage 22 which is slidably displaced on the X-axis carriage 21 in a Y-axis direction in response to the Y-axis input signal. The Y-axis carriage 22 is coupled to a recording head 23 which holds a recording pen 24. The recording pen 24 is moved up and down under the control of the controller 6, so that a recording line is provided on a plotting surface 26 according to signals which are provided directly or indirectly from the controller 6. A cursor 25 is coupled to the recording pen 24 in the recording head. A coordinate point can be specified on the plotting surface 26 by positioning the cursor 25. The setting means 4 is adapted to set plotting data. A keyboard may be employed as the setting means 4, an example of which is shown in FIG. 3.

Figure 3:
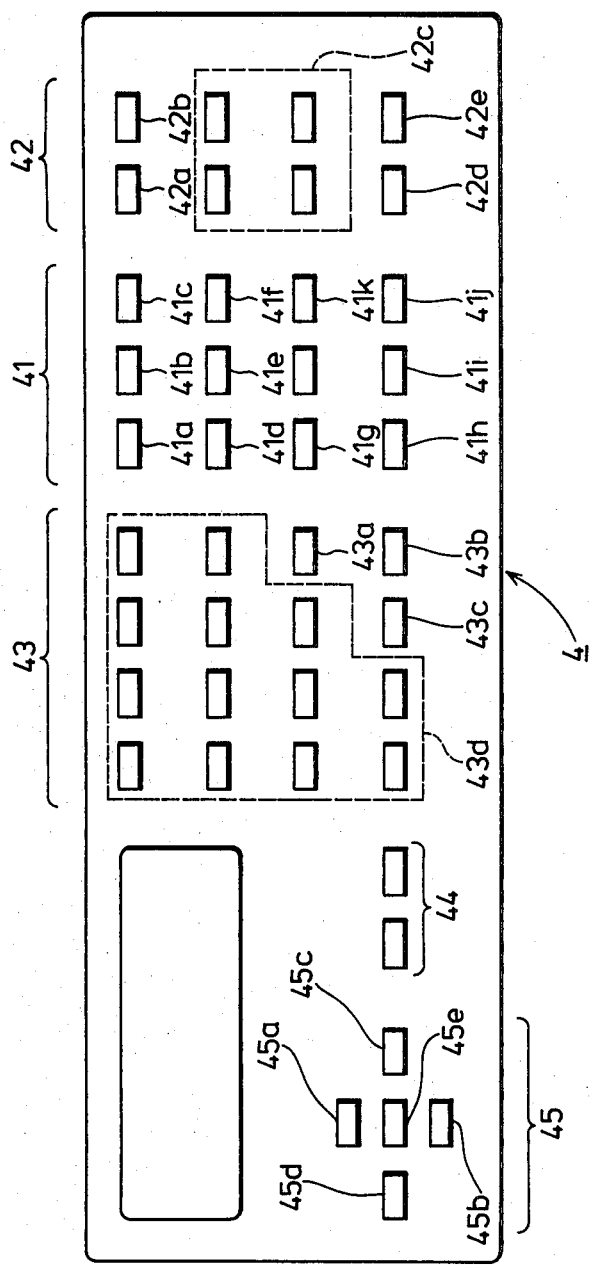
FIG. 3 is an explanatory diagram showing a keyboard which is one example of data setting means employed in the interactive graphic system of the invention.

In FIG. 3, the keyboard 4 includes a function key group 41, an execution key group 42, a general key group 43 consisting of digit keys, character keys, symbol keys, etc; and up and down keys 44 for instructing the recording pen 24 to move up and down. When the recording pen is instructed to move up or down, the up and down control is then effected by the controller 6. Further in FIG. 3, a cursor movement key group 45 is provided for moving the cursor 25 in the X- and Y-axis directions. The function key group 41 includes keys 41a, 41b and 41c which specify a bar graph, a polygonal line and a pie chart, respectively; a key 41d for specifying the drawing of a graph axis or of an axis label; a character specifying key 41e for specifying a character and a digit, or the size thereof; a hatching key 41f for specifying hatching lines applied to the bar graph or the pitch of hatching lines; keys 41g, 41h and 41i for specifying a straight line, an arc and a circle, respectively; a key 41j for specifying an original point; and a key 41k which is used in an operation test or for specifying coordinates. The key to which two functions are assigned, can select one of the functions when it is operated in association with a shift key 43b included in the general key group 43.

The execution key group 42 includes: a plotting direction key 42a for specifying a plotting direction (or an axial direction); a mode key 42b for selecting an execution mode or a store mode; an edit key group 42c for editing programs; a run key 42d for running programs stored; and a stop key 42e for stopping the execution of a program midway. The edit key group 42c includes: an insertion key which is used to additionally insert stored data; an erasing key for erasing a part of stored contents; a line specifying key for specifying the line number of a stored program; and a read key for reading stored contents.

The general key group 43 includes: character keys 43d consisting of character keys, digit keys and symbol keys; an input key 43a for inputting instructions or data; a shift key 43b; and a space key 43c which is used in spacing or back-spacing.

The cursor movement key group 45 includes: movement direction keys 45a, 45b, 45c and 45d for specifying four movement directions of the cursor 25 respectively; and an acceleration key 45e for increasing the speed of movement of the cursor 25. The cursor 25 can be moved to a desired position on the plotting surface by operating these keys.

The outputs of the above-described keys on the keyboard 4 are applied to the controller 6.

The display means 5 operates to display contents for requiring plotting data inputs. The display means 5 may be constituted by light emitting elements such as light emitting diodes, or liquid crystal display units. Contents to be displayed on the display means 5 are given by the controller 6.

The controller 6 has various programs necessary for plotting operations, executes a program according to plotting data applied through the keyboard, and suitably controls the operations of various sections. A microprocessor may be employed as the controller 6.

The operation of the interactive graphic system thus organized will be described with reference to the case where, for instance, a bar graph is drawn, by referring to FIGS. 4 and 5. FIGS. 4 and 5 indicate operating procedures using operating keys on the keyboard 4 in accordance with the contents displayed on the display means 5.

(1) First an axis drawing operation will be described.

Figure 6:
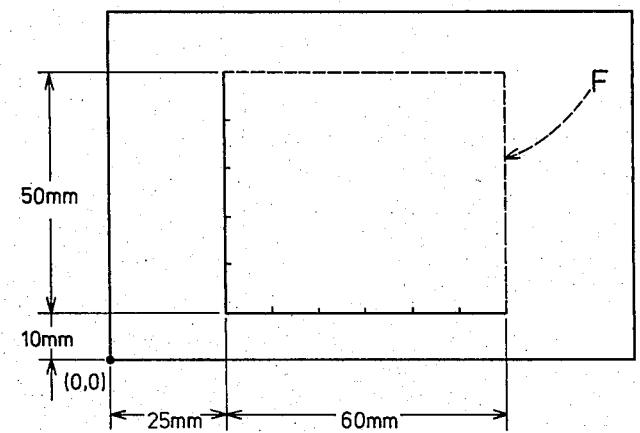
FIGS. 6 and 7 are explanatory diagrams showing a graph drawn according to the operating procedure shown in FIGS. 4 and 5.

The axis drawing key 41d and the bar graph key 41a in the function key group 41 are operated successively. Thereafter, axes and axis scale markings are drawn according to the operating procedure in FIG. 4. More specifically, with the display "AXIS" on the display means 5 confirmed, the axis drawing key 41d and the input key 43a are depressed. In this connection, it should be noted that it is necessary to depress the input key 43a after data such as plotting parameters are inputted. The controller 6 reads the axis drawing data, and then displays the display "SIZE X,Y=" for inquiring the lengths of the X and Y axes on the display means 5. In response to this display, data "60 and 50" are inputted by using the general key group 43, to set the lengths of the X and Y axes to 60 mm and 50 mm. In succession with this, in response to the display "ORIGIN=" inquiring for the position of the original point, the coordinates "25, 10" of the original point are keyed in. The position of the original point can be specified with the cursor 25. In this case, the cursor 25 is moved to a desired position by operating the cursor movement key group 45 and is then positioned by depressing the coordinate specifying key 41k. Next, the number of segments of the X-axis is inquired with the display "X SEGMENT=." In response to this, for instance the digit "6" is inputted. Similarly, the digit "5" is inputted for the Y-axis. In succession with this, the display "FRAME=" is provided. In this case, "0" or "1" is inputted depending on whether or not plotting the frame F is required. Thus, the axes have been drawn on the plotting surface 26 of the recorder 2 as shown in FIG. 6.

Figure 7:
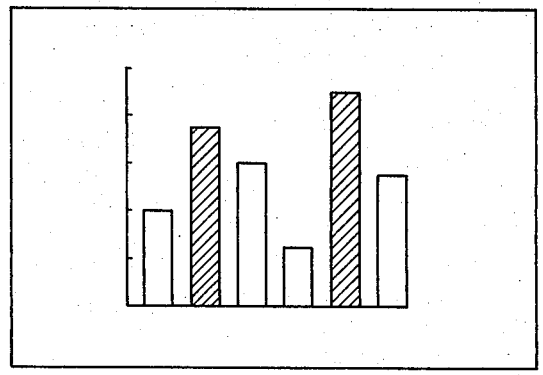

(2) An operation for drawing bar graphs on the axes thus drawn as shown in FIG. 7 will be described.

After the display "B.GRAPH" has been confirmed, the bar graph key 41a and the input key 43a are depressed. In response to the display "NO OF DATA=," the total number "6" of data is specified with the keys. Next the display "GRAPH PATTERN=" inquiring for the type of a graph is displayed on the display means. In response to this display, the number "1" indicating the type of the graph is inputted. Then, the value "0" is inputted for the display "MINIMUM Y=" inquiring the minimum value of the Y-axis, and the value "100" is inputted for the display "MAXIMUM Y=" inquiring the maximum value of the Y-axis. Thereafter, in response to data requests "DATA 001=" "DATA 002", ... and "DATA 006=" displayed successively beginning with the first segment, the corresponding values "40," "75," ... and "55" are inputted one after another. In the case where it is required to shade the bar graph as shown in FIG. 7, the hatching key 41f is depressed after the display "END" has been confirmed. In this case, the display "DATA=" appears in the display means 5. In response to this display, the value "2" is inputted to specify the second bar from the original point. Then, in response to the display "PATTERN=," the number "1" indicating the kind of the pattern is inputted. The fifth bar from the original point can be specified so as to be shaded, similarly as in the above-described case, after the display ">" has been confirmed. As was described above, the graph can be drawn directly on the recorder 2 by keying in the plotting data in a step-by-step mode in the interactive system with the displays on the display means 5, under the control of the controller 6.

In the case where the mode key 42b is set to the execution mode, the execution is effected to advance the plotting operation for every instruction. In the case where the mode key 42b is set to the store mode, all the programs set are stored, and therefore by depressing the run key 42d after the mode key has been switched to the execution mode the stored programs are executed, so that the bar graph can be drawn at once. Amendment, addition or elimination of the stored programs can be carried out as desired if the statements of the relevant program or programs are called to the display means 5 by operating the edit key group 42c and other relevant keys.

Substantially similarly as in the above-described bar graph plotting operation, a polygonal line or a pie chart can be drawn by giving suitable plotting data.

The key operating sequence and the display words appearing on the display means 5 are not limited to those described above; that is, they may be modified so as to be suitable or convenient for the user.

The plotting parameters are inputted by operating the keyboard in the above-described case; however, they may be inputted through an interface from an external unit. In the case where it is required to insert characters or symbols in a graph constructed on the plotting surface, the respective recording positions are specified as coordinates or specified by the cursor and then the characters or symbols to be inserted and the sizes thereof are specified.

As is apparent from the above description, according to the interactive graphic system of the invention, the plotting means, the keyboard, the display means and the controller are formed into one unit. Therefore, with the graphic system only, intricate graphs, characters and symbols can be drawn. The special keys for instruction words and sentences concerning a bar braph, a polygonal line and a pie chart are provided on the keyboard. Intricate graphs can be readily plotted by operating these special keys and the general keys in a simple manner.

Since the display words and the operating procedure are substantially similar to the words and the procedure which are employed in an actual graph plotting operation, it is not always necessary that the operator be a specialist for the interactive graphic system; that is, a graph can be readily drawn even by an ordinary operator as desired. Furthermore, if the position of the recording pen can be predetermined by specifying the necessary coordinates or by positioning the cursor, then the arrangement of a drawing can be determined before the plotting operation. Therefore, the interactive graphic system of the invention is advantageous in that the labor and time required for a preliminary plotting operation can be saved when compared with a conventional device in which a hard copy is prepared by the plotter after a draft is temporarily drawn on the cathode-ray-tube display unit.

The interactive graphic system of the invention can draw not only graphs but also various patterns or figures by using lines, symbols, etc.

Since other changes and modifications varied to fit particular operating requirements and environments will be apparent to those skilled in the art, the invention is not considered limited to the examples chosen for purposes of illustration, and covers all changes and modifications which do not constitute a departure from the true spirit and scope of this invention.

What is claimed is:

1. An interactive graphic system comprising:

a plotting means having a recording head with a recording pen positioned therein which is adapted to be driven by input signals, said plotting means having a plotting surface for recording lines, symbols or marks applied therein by said recording pen, a keyboard including a plurality of special keys for various functions with respect to drawing a bar graph, a line graph, and a pie chart and general keys for characters, digits and symbols, a controller coupled to said keyboard for executing predetermined programs according to data from said keyboard, and display means coupled to said controller for displaying instructions having an appropriate input of necessary data for plotting in a step-by-step manner in an interactive system, whereby lines, symbols or marks can be directly recorded on said plotting surface of said plotting means by said keyboard.

2. An interactive graphic system as claimed in claim 1, in which said recording head is provided with a cursor coupled to said recording pen, and the position of said recording pen is specified by positioning said cursor.

3. An interactive graphic system as claimed in claim 1 in which said keyboard comprises cursor movement keys for specifying the direction of movement of said cursor and an acceleration key for increasing the speed of movement of said cursor, said cursor being movable by operation of said cursor movement keys or by simultaneous operation of said cursor movement keys and said acceleration key.

4. An interactive graphic system as claimed in claim 1, in which said plotting means comprises a digital plotter.

5. An interactive graphic system as claimed in claim 1, in which said plotting means comprises an analog X-Y recorder.

6. An interactive graphic system as claimed in claim 1, in which said keyboard has an execution mode means in which an execution is effected immediately to advance the plotting operation for every instruction thereby set, and a store mode means in which instructions are stored once, and all the plotting operations are carried out at once after the stored instructions have been stored.

* * * * *